United States Patent [19]

Suh et al.

[11] Patent Number: 5,380,767
[45] Date of Patent: Jan. 10, 1995

[54] FOAMABLE GEL WITH AN AQUEOUS BLOWING AGENT EXPANDABLE TO FORM A UNIMODAL STYRENIC POLYMER FOAM STRUCTURE AND A PROCESS FOR MAKING THE FOAM STRUCTURE

[75] Inventors: Kyung W. Suh; Andrew N. Paquet, both of Granville, Ohio

[73] Assignee: The Dow Chemical Company, Midland, Mich.

[21] Appl. No.: 965,589

[22] Filed: Oct. 23, 1992

[51] Int. Cl.⁶ .............................................. C08J 9/00
[52] U.S. Cl. ........................................ 521/79; 521/74; 521/79; 521/80; 521/82; 521/97; 521/142; 521/146; 521/910; 264/50; 264/51
[58] Field of Search ...................... 521/74, 79, 80, 82, 521/97, 142, 146, 910; 264/50, 51

[56] References Cited

U.S. PATENT DOCUMENTS

| 4,455,272 | 6/1984 | Schubert et al. ........................ 264/53 |
| 4,559,367 | 12/1985 | Hurps et al. ............................ 521/79 |
| 5,244,927 | 9/1993 | Binder et al. ........................... 521/79 |

FOREIGN PATENT DOCUMENTS 0353701 2/1990 European Pat. Off. .

*Primary Examiner*—Samuel A. Acquah
*Attorney, Agent, or Firm*—J. Robert Dean, Jr.

[57] ABSTRACT

Disclosed is a foamable styrenic polymer gel containing an aqueous blowing agent capable of forming a closed-cell, unimodal foam structure. The gel composes in admixture the flowable melt of a polymer composition having greater than 50 percent by weight of a styrenic polymer and a blowing agent having about 1 percent or more by weight water based upon the total weight of the blowing agent. The styrenic polymer has a degree of water solubility sufficient to ensure formation of a unimodal foam structure instead of a bimodal foam structure. The unimodal cell size distribution provides desirable fabricability and machinability characteristics for the foam structure.

25 Claims, No Drawings

FOAMABLE GEL WITH AN AQUEOUS BLOWING AGENT EXPANDABLE TO FORM A UNIMODAL STYRENIC POLYMER FOAM STRUCTURE AND A PROCESS FOR MAKING THE FOAM STRUCTURE

The invention relates to a foamable styrenic polymer gel expandable to form a closed-cell, unimodal foam structure with an aqueous blowing agent and a process for making the structure.

BACKGROUND OF THE INVENTION

Due to present environmental concerns over the use of potentially ozone-depleting or flammable blowing agents, it is desirable to make styrenic polymer foam structures with aqueous blowing agents. Such foam structures made with aqueous blowing agents can be seen in U.S. Pat. No. 4,455,272, U.S. Pat. No. 4,559,367, and European Patent Application 89114160.8.

A problem with styrenic polymer foam structures made with aqueous blowing agents is the formation of bimodal cell structures of relatively larger primary foam cells and relatively smaller secondary foam cells. The bimodal cell structure makes machining and fabricating difficult since the smaller secondary cells govern mechanical properties. Easy machinability and fabricability of foam structures is important in decorative, floral, novelty, and craft applications as well as tongue and groove cutting.

It would be desirable to have a closed-cell, styrenic polymer foam structure blown with an aqueous blowing agent that is easy to machine and fabricate. It would be desirable to have such a foam structure with a unimodal or primary cell size distribution.

SUMMARY OF THE INVENTION

According to the present invention, there is a foamable styrenic polymer gel capable of forming a closed-cell, unimodal foam with enhanced machinability and fabricability. The gel comprises in admixture a flowable melt of a styrenic polymer material having greater than 50 percent by weight of styrenic monomeric units and a blowing agent having at least about 1 percent by weight water based upon the total weight of the blowing agent. The styrenic polymer melt has a water solubility sufficient to provide for formation of a styrenic polymer foam structure having a unimodal cell size distribution upon expansion of the gel. The desired level of solubility may be obtained by employing a styrenic polymer material of sufficiently low molecular weight or solubilizing or compatibilizing additives or polymers.

Further according to the present invention, there is a foamable styrenic polymer material as described above except that the blowing agent comprises a quantity of water sufficient to provide for formation of a foam structure having a substantially bimodal cell size distribution and consisting essentially of polystyrene of about 200,000 weight average molecular weight with about 20 weight percent or less of the polystyrene being individual polymer molecules each less than 20,000 molecular weight.

Further according to the present invention, there is a process for making a closed-cell styrenic polymer foam structure having a unimodal cell size distribution. The process comprises: a) heating a styrenic polymer material having greater than 50 percent by weight styrenic monomeric units based upon the total weight of the styrenic polymer material to form a melt polymer material having a water solubility sufficient to provide for formation of a styrenic polymer foam structure having a substantially unimodal cell size distribution; b) incorporating into the melt polymer material at an elevated temperature a blowing agent comprising about 1 percent or more by weight water based upon the total weight of the blowing agent to form a foamable gel; and c) expanding the foamable gel through a die to form a foam structure.

DETAILED DESCRIPTION

The styrenic polymer foamable gel of the present invention forms, upon expansion, a foam structure having a unimodal cell size distribution. Forming a unimodal foam structure from a foamable gel containing certain quantities of an aqueous blowing agent is heretofore unknown because aqueous blowing systems typically cause formation of foam structures with a bimodal cell size distribution.

Unimodal foam structures and bimodal foam structures differ in the configuration of their respective cell size distributions. A unimodal cell size distribution is one in which the cells are of a generally uniform size throughout the foam structures, except for the skin regions in the case of extruded foam. A bimodal cell size distribution is one in which there is one group of relatively larger primary foam cells of generally uniform size and another group of relatively smaller secondary foam cells of generally uniform size ranging in average cell size from about 5 percent to about 50 percent of the average cell size of the primary cells. The secondary cells may be situated within the cell walls or struts of the primary cells, or may be situated outside of or adjacent to the primary cells individually or in groups of two or more. A strut is a juncture of three or more cell walls. The primary cells may be generally dispersed throughout the secondary cells such that the foam structure has a generally heterogeneous dispersion of the two cell types throughout. Additional teachings directed to foam structures with bimodal cell distributions are seen in U.S. Pat. Nos. 4,455,272 and 4,559,367, U.S. Ser. Nos. 07/895,970 filed Jun. 9, 1992 abandoned and 07/896,025 filed Jun. 9, 1992, abandoned and European Patent Application No. 89114160.8, which are incorporated herein by reference.

The prior art is instructive concerning processes for making bimodal foam structures with aqueous blowing agent systems. U.S. Pat. No. 4,559,367 relates a process for making a bimodal foam structure by incorporating finely-divided, water-containing organic vegetable matter into a polymer feedstock, melting the resulting solid mixture, incorporating a volatile foaming agent into the solid mixture melt to form a foamable mixture, and extruding the foamable mixture through a die to form the foam structure. U.S. Pat. No. 4,455,272 relates a process for making a bimodal foam structure by injecting water and a physical blowing agent into a polymer melt and extruding the resulting mixture through a die to form the structure. EPO Application No. 89114160.8 relates a process for making a bimodal foam structure by incorporating into the polymer feedstock a fine, water-absorbing mineral powder, melting the resulting solid mixture, incorporating a volatile foaming agent into the solid mixture melt to form a foamable mixture, and extruding the foamable mixture through a die to form the foam structure.

Though not bound by any particular theory, bimodal cell size distributions are believed to result when foamable gels contain a level of water exceeding the solubility of water in the polymer melt at the extant processing conditions (e.g. temperature, pressure, mechanical agitation, etc.). The excess water manifests itself in the form of secondary cells upon expansion of the foamable gel to a foam structure.

Use of aqueous blowing agent systems comprising about 1 or more weight percent or more water by weight based upon the total weight of the blowing agent typically result in bimodal foam distributions in foam structures made from commercially-available styrenic polymers, particularly polystyrene.

The present invention sets forth a process for making a closed-cell, unimodal foam structure with an aqueous blowing agent system and a foamable gel expandable to form such structure. An important feature of the invention is the formation of a foamable gel having a level of water solubility sufficiently high to enable expansion of the gel to form a unimodal foam structure and avoid formation of a bimodal foam structure. A sufficiently high level of water solubility may be attained by selecting a styrenic polymer material of requisite water solubility or by addition of solubilizing or compatibilizing agents to the styrenic polymer material. Desirably, the polymer material will have a water solubility of about 0.4 parts or more water and more desirably 3 parts or more water by weight per hundred parts by weight polymer melt at 125° C. The 0.4 parts level is approximately the lower limit of solubility in which a conventional polystyrene resin will form the desired unimodal foam structure.

The present foam structure comprises a styrenic polymer material. Suitable styrenic polymer materials include styrenic homopolymers and copolymers of styrenic compounds and copolymerizable ethylenically unsaturated comonomers. The styrenic polymer material may further include minor proportions of non-styrenic polymers. The styrenic polymer material may be comprised solely of one or more styrchic homopolymers, one or more styrenic copolymers, a blend of one or more of each of styrenic homopolymers and copolymers, or blends of any of the foregoing with a non-styrenic polymer. Regardless of composition, the styrenic polymer material comprises greater than 50 and preferably greater than 70 weight percent of styrenic monomeric units. Most preferably, the styrenic polymer material is comprised entirely of styrenic monomeric units. The styrenic polymer material preferably has a weight average molecular weight of 100,000–350,000 according to size exclusion chromatography.

Suitable styrenic polymers include those derived from styrenic compounds such as styrene, alphamethylstyrene, ethylstyrene, vinyl benzene, vinyl toluene, chlorostyrene, and bromostyrene. Minor amounts of monoethylenically unsaturated compounds such as $C_{1-4}$ alkyl acids and esters, ionomeric derivatives, and $C_{2-6}$ dienes may be copolymerized with styrenic compounds. Examples of copolymerizable compounds include acrylic acid, methacrylic acid, ethacrylic acid, maleic acid, itaconic acid, acrylonitrile, maleic anhydride, methyl acrylate, ethyl acrylate, butyl acrylate, propyl acrylate, methyl methacrylate, vinyl acetate, vinyl alcohol, amides, and butadiene. Preferred structures comprise substantially polystyrene (i.e. greater than 80% by weight) and most preferably entirely of polystyrene because polystyrene foam is economical, and is commonly employed as an insulating plastic foam.

A means of attaining a sufficient level of water solubility in the styrenic polymer melt of the foamable gel is to incorporate previously-processed or recycled styrenic polymer into the melt. The lower molecular polymerst oligomers, and inorganic foam processing additives increase the water solubility of the melt over a corresponding melt without the previously-processed or recycled styrenic polymer. The lower molecular weight polymers and oligomers are present in the previously-processed or recycled styrenic polymer because of the process shearing and temperature degradation the previously-processed or recycled styrenic polymer previously underwent.

Another means of attaining a sufficient level of water solubility is to incorporate into the styrenic polymer material melt minor proportions (i.e. less than 15 weight percent) of relatively hydrophilic polymers or copolymers such as polyethylene, polyvinyl acetate, polyacrylonitrile, and $C_{1-4}$ polycarboxylic acids and acrylates. The relatively hydrophilic polymers increase the water solubility of the styrenic polymer material melt over a corresponding polymer melt without the hydrophilic polymers.

Another means of attaining a sufficient level of water solubility is to incorporate a solubilizing or compatibilizing agent into the styrenic polymer material melt to increase the water solubility of the melt over a corresponding polymer melt without the agent. The agent would increase water solubility of the melt in the typical foaming temperature range for styrenic polymers of between 110°–135° C. The agents are at least partly soluble in both the melt and water. Representative solubilizing or compatibilizing agents include the following:

saturated and unsaturated aliphatic or aromatic alcohols having the formula

R—OH wherein R is a linear or cyclic alkyl or alkenyl group having 1–10 carbon atoms;
ketones having the formula

wherein R and R' are aliphatic or aromatic groups of 1–10 carbon atoms;
carboxylic acids having the formula

R—COOH wherein R is an H (hydrogen atom) or an aliphatic or aromatic group of 1–10 carbon atoms;
esters having the formula

R—COO—R' wherein R and R' are an H or aliphatic or aromatic groups of 1–10 carbon atoms;
aldehydes having the formula

wherein R is an aliphatic or aromatic group of 1–10 carbon atoms;
aliphatic and aromatic amines having the formula

R—NH$_2$ wherein R is an aliphatic or aromatic group of 1–10 carbon atoms; and
ethers having the formula

R—O—R' wherein R and R' are aliphatic or aromatic groups of 1–10 carbon atoms.

The unimodal structure may contain additional additives such as pigments, fillers, antioxidants, extrusion aids, nucleating agents, stabilizing agents, antistatic agents, fire retardants, acid scavengers, or the like.

The foam component of the unimodal foam structure preferably has density of about 16 to about 80 kilograms per cubic meter. The foam component further preferably has an average cell size of about 0.05 to about 2.4 millimeters.

The unimodal foam structure is generally formed by melting and mixing the styrenic polymer itself or with other polymers if present to form a plastic melt, incorporating a blowing agent into the plastic melt to form a foamable gel, and extruding the foamable gel through a die to form the foamed structure. During melting and mixing, the polymers are heated to a temperature at or above the glass transition temperature or at or above the melting point of the polymer. Melting and mixing of polymers and any additives is accomplished by any means known in the art such as with an extruder, mixer, or blender. Likewise the blowing agent, including water, is incorporated or blended into the plastic melt by any of the same above-described means. The blowing agent is blended with the plastic melt at an elevated pressure sufficient to prevent substantial expansion of the resulting plastic gel or loss of generally homogeneous dispersion of the blowing agent within the gel. The blowing agent is incorporated into the melt in a weight proportion of between about 1 to about 30 parts and preferably from 3 to 15 parts per hundred parts of the polymer to be expanded. The foam gel is preferably passed through a cooler or cooling zone to lower the gel temperature to an optimum foaming temperature. For polystyrene, typical optimum foaming temperatures range from 110° C. to 135° C. The cooled gel is then passed through the die into a zone of lower or reduced pressure to form the foam structure. The zone of lower pressure is at a pressure lower than that in which the foamable gel is maintained prior to extrusion through the die. The lower pressure may be super atmospheric or subatmospheric (vacuum), but is preferably at an atmospheric level.

Water preferably comprises about 1 weight percent or more and more preferably about 3 weight percent or more of the blowing agent based upon the total weight of the blowing agent. Water may be incorporated into the polymer melt or polymer feedstock in the form of a water-carrying or water-generating solid, a liquid, or a vapor or gas. Incorporation of water in the form of a liquid or vapor is preferred.

The level of water in the blowing agent sufficient to provide the unimodal foam structure may alternately be characterized relative to the level necessary to provide a bimodal foam structure comprised of polystyrene commonly employed commercially to make foam structures. A commonly-employed polystyrene consists essentially of polystyrene of about 200,000 weight average molecular weight with about 20 weight percent or less of the polystyrene being of individual polymer molecules each less than about 20,000 molecular weight as determined by size exclusion chromatography. The molecular weight of about 20,000 corresponds approximately to the lower threshold of entanglement molecular weight for the polystyrene. A maximum fraction of low molecular weight molecules is specified to better characterize the polystyrene since the low molecular weight fractions of the polystyrene substantially determine its extent of water solubility. The commonly-employed polystyrene is described as consisting essentially of polystyrene since it refers to a certain reference polystyrene irrespective of other polymers or agents which may impact the water solubility of the reference (commonly-employed) polystyrene. The foamable gel of the present invention may comprise a level of water sufficient in a reference foamable gel of the reference (commonly-employed) polystyrene to form a bimodal foam structure of the reference polystyrene. The present foam gel nonetheless comprises a styrenic polymer material having a water solubility sufficient to result in a foam structure of a substantially unimodal cell size distribution.

The styrenic polymer material of the present foamable gel is not limited in any way to the reference (commonly-employed) polystyrene referred to above. As stated previously, the styrenic polymer material may vary in weight average molecular weight from 100,000 to 350,000. The reference to the commonly-employed resin is made so that the water content of the blowing agent and the water solubility of the melt material may be described functionally without referring to specific quantities or proportions of water.

Blowing agents which may be utilized in combination with water include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–9 carbon atoms and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane, 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4- oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

Preferred blowing agents are those using a combination of water and an inorganic blowing agent such as nitrogen, carbon dioxide, krypton, or argon. A most preferred blowing agent comprises water and carbon dioxide. The blowing agent comprises an amount of water sufficient to form the bimodal structure. The blowing agent preferably comprises from about 1 to about 80 weight percent water, more preferably from about 3 to about 80 weight percent water, and most preferably between about 5 and about 60 weight percent water based upon the total weight of the blowing agent.

The unimodal foam structure is preferably closed-cell, and has a closed-cell content of at least 90 percent according to ASTM D2856-87.

Though the preferred process for making the present structure is an extrusion process, it is understood that the above structure may be formed by expansion of beads, which may be molded at the time of expansion to form structures of various shapes. Insulating panels formed from molded, expandable beads are commonly referred to as bead board.

The unimodal foam structure may be used to insulate various surfaces by applying to the surface an insulating panel fashioned from the present structure. Such panels may be used in any conventional insulating application such as roofing, buildings, refrigerators, etc.

The unimodal foam structure may also be formed into a variety of plurality of discrete foamed particles for conventional loose-fill cushioning and packaging applications.

The following are examples to illustrate various aspects of the present invention, and are not to be construed as limiting. All percentages and parts are by weight unless otherwise noted.

EXAMPLES

Example 1

Foam structures were made with an apparatus comprising a single-screw extruder, mixers, a cooler, and a die in series. General Purpose Polystyrene (200,000 weight average molecular weight by size exclusion chromotography) (The Dow Chemical Company) was fed to the extruder with 30 percent by weight recycle polystyrene of 150,000 weight average molecular weight according to size exclusion chromatography. 0.05 parts per hundred magnesium oxide, 0.05 parts per hundred calcium stearate, and 1.0 parts per hundred hexabromocyclododecane by weight were added to the polystyrene in the extruder. 1.5 parts per hundred water and 4 parts per hundred carbon dioxide mixture was added to the polymer melt in the mixer to form a foamable gel. The foamable gel was cooled to 125° C. and extruded through the die and expanded between substantially parallel forming plates. The die pressure was 1100 pounds per square inch (psig). The foam structure had a unimodal cell size distribution with a relatively large average cell size of 0.2 millimeter (mm) and a density of 2.1 pounds per cubic foot (pcf). The machinability of the foam structure was excellent as determined by the router test.

Example 2

Styrenic polymer foam structures were made using the same formulation and the apparatus of Example 1 except that the blowing agent comprised 2.0 pph water and 2.0 pph carbon dioxide. The foam had a unimodal cell size distribution of 1.7 mm and a density of 2.0 pcf. The machinability of these foam structures was good as determined by the router test.

What is claimed is:

1. A foamable styrenic polymer gel comprising:
   a) a flowable melt of a styrenic polymer material comprising greater than 50 percent by weight styrenic monomeric units based upon the total weight of the styrenic polymer material;
   b) a blowing agent comprising about 1 weight percent or more water based upon the total weight of the blowing agent; and
   c) the styrenic polymer melt having a water solubility sufficient to provide for formation of a styrenic polymer foam structure having a substantially unimodal cell size distribution upon expansion of the styrenic polymer gel.

2. The gel of claim 1, wherein the blowing agent comprises about 3 percent or more water by weight based upon the total weight of the blowing agent.

3. The gel of claim 1, wherein the styrenic polymer melt has a water solubility of about 0.4 parts or more by weight water per hundred parts by weight styrenic polymer melt.

4. The gel of claim 1, wherein the styrenic polymer melt further comprises a solubilizing agent which increases the water solubility of the styrenic polymer melt relative to a corresponding styrenic polymer melt without the solubilizing agent.

5. The gel of claim 1, wherein the styrenic polymer material is polystyrene.

6. The gel of claim 1, wherein the styrenic polymer material has greater than 70 percent by weight styrenic monomeric units based upon the total weight of the styrenic polymer material.

7. A foamable styrenic polymer gel, comprising: a) a flowable melt of a styrenic polymer material comprising greater than 50 percent by weight styrenic monomeric units based upon the total weight of the styrenic polymer material; b) a blowing agent incorporated into the styrenic polymer melt, the blowing agent comprising water, the styrenic polymer material melt having a water solubility sufficient to provide for formation of a styrenic polymer foam structure having a substantially unimodal cell size distribution upon expansion of the styrenic polymer gel, wherein the water content in the blowing agent is sufficient to result in a reference foamable styrenic polymer gel consisting essentially of the blowing agent and a reference polystyrene of about 200,000 weight average molecular weight with about 20 weight percent or less of the polystyrene being of individual polymer molecules each less than 20,000 molecular weight being expandable to form a substantially bimodal foam structure.

8. The gel of claim 7, wherein the blowing agent comprises about 3 percent or more water by weight based upon the total weight of the blowing agent.

9. The gel of claim 7, wherein the styrenic polymer melt has a water solubility of about 0.4 parts or more by weight water per hundred parts by weight styrenic polymer melt.

10. The gel of claim 7, wherein the styrenic polymer melt further comprises solubilizing agent which increases the water solubility of the styrenic polymer melt relative to a corresponding styrenic polymer melt without the solubilizing agent.

11. The gel of claim 7, wherein the styrenic polymer material is polystyrene.

12. The gel of claim 7, wherein the styrenic polymer material has greater than 70 percent by weight styrenic monomeric units based upon the total weight of the styrenic polymer material.

13. The gel of claim 7, wherein the styrenic polymer material has a weight average molecular weight of from 100,000 to 350,000.

14. The process for making a styrenic polymer foam structure with a unimodal cell size distribution, comprising:
   a) heating a styrenic polymer material comprising greater than 50 percent by weight styrenic monomeric units based upon the total weight of the styrenic polymer material to form a melt polymer material, the melt polymer material having a water solubility sufficient to provide for formation of a styrenic polymer foam structure having a substantially unimodal cell size distribution;
   b) incorporating into the melt polymer material at an elevated pressure a blowing agent comprising about 1 weight percent or more water based upon the total weight of the blowing agent to form a foamable gel;
   c) expanding the foamable gel at a reduced pressure to form the foam structure.

15. The process of claim 14, wherein the foamable gel is extruded through a die to form a foam structure.

16. The process of claim 14, wherein the foamable gel is cooled to an optimum foaming temperature prior to extrusion through the die.

17. The process of claim 14, wherein a nucleating agent is incorporated into the melt polymer material.

18. The process of claim 14, wherein the blowing agent is incorporated into the melt polymer material at a concentration of from about 1 to about 30 parts by weight per hundred parts of melt polymer material.

19. The process of claim 14, wherein the blowing agent incorporated into the melt polymer material comprises 3 percent or more by weight water based upon the total weight of the blowing agent.

20. The process of claim 14, wherein the blowing agent is a mixture of carbon dioxide and water.

21. The process of claim 14, wherein the polymer melt material has a water solubility of 0.4 parts or more by weight water per hundred parts by weight melt polymer material at 125° C.

22. The process of claim 14, wherein a solubilizing agent is incorporated into the melt polymer material to increase the water solubility relative to a corresponding melt polymer material without the solubilizing agent.

23. The gel of claim 14, wherein the styrenic polymer material is polystyrene.

24. The gel of claim 14, wherein the styrenic polymer material has greater than 70 percent by weight styrenic monomeric units based upon the total weight of the styrenic polymer material.

25. The process of claim 14, wherein the polymer melt material has a water solubility of 3 parts or more by weight water per hundred parts by weight melt polymer material at 125° C.

* * * * *